(12) United States Patent
Saito et al.

(10) Patent No.: US 7,655,078 B2
(45) Date of Patent: Feb. 2, 2010

(54) BUBBLE SEPARATOR

(75) Inventors: Yasuhiro Saito, Tokoname (JP); Toshihiro Takahara, Kariya (JP)

(73) Assignee: Toyota Boshoku Kabushiki Kaisha, Kariya-shi (JP)

( * ) Notice: Subject to any disclaimer, the term of this patent is extended or adjusted under 35 U.S.C. 154(b) by 442 days.

(21) Appl. No.: 11/583,835

(22) Filed: Oct. 20, 2006

(65) Prior Publication Data

US 2007/0163442 A1    Jul. 19, 2007

(30) Foreign Application Priority Data

Jan. 16, 2006  (JP)  ............... 2006-007880

(51) Int. Cl.
*B01D 19/00* (2006.01)

(52) U.S. Cl. .............. 96/208; 96/210; 96/212; 96/216

(58) Field of Classification Search .......... 96/209, 96/210, 211, 212, 208, 216; 95/261; 55/460, 55/459.1, 454

See application file for complete search history.

(56) References Cited

U.S. PATENT DOCUMENTS 3,771,290 A * 11/1973 Stethem .................. 96/210
4,363,641 A * 12/1982 Finn, III ................ 96/156
6,129,775 A * 10/2000 Conrad et al. ............. 55/337

FOREIGN PATENT DOCUMENTS

JP          2003-265984           9/2003

OTHER PUBLICATIONS

U.S. Appl. No. 11/763,080, filed Jun. 14, 2007, Saito.

* cited by examiner

*Primary Examiner*—Duane Smith
*Assistant Examiner*—Douglas J Theisen
(74) *Attorney, Agent, or Firm*—Oblon, Spivak, McClelland, Maier & Neustadt, L.L.P.

(57) ABSTRACT

A bubble separator includes a body with a generally cylindrical shape, an oil induction portion, a gas discharge portion with a generally cylindrical shape, an oil discharge portion, and an upper partition. The oil induction portion is provided on the body, and introduces bubble-containing oil to inside the body. The gas discharge portion is provided extending from a ceiling portion of the body, and discharges separated bubbles to outside the body. The oil discharge portion is provided on the body, and discharges separated oil to outside the body. The upper partition is provided extending from the ceiling portion, and is formed on a periphery of the gas discharge portion. According to the bubble separator of the present invention, the upper partition can prevent bubble-containing oil from directly blowing into the discharge hole of the gas discharge portion and discharging to outside the body together with separated gas.

6 Claims, 7 Drawing Sheets

BUBBLE SEPARATOR

INCORPORATION BY REFERENCE

The disclosure of Japanese Patent Application No. 2006-007880 filed on Jan. 16, 2006 including the specification, drawings and abstract is incorporated herein by reference in its entirety.

BACKGROUND OF THE INVENTION

1. Field of the Invention

The present invention relates to a bubble separator. More specifically, the present invention relates to a bubble separator that is capable of suppressing remixing after bubble separation, and is particularly capable of performing bubble separation with a high bubble separation efficiency for oil used in a lubrication system for an internal combustion engine.

2. Description of the Related Art

Dry sump and wet sump systems are commonly known as modes for lubricating internal combustion engines. The dry sump system is a type in which engine oil collects in an oil tank and the engine oil is sent under pressure from the oil tank through a feed pump to lubricate respective parts of the engine. Oil that falls into an oil pan is then returned to the oil tank through a scavenger pump. The wet sump system is a type in which engine oil is intaken from the oil pan by a pump and sent under pressure to lubricate respective parts of the engine. Oil that has finished lubricating then falls of its own accord into the oil pan.

However, in the dry sump system a considerable amount of air bubbles are mixed into the oil while it is being returned to the oil tank via the scavenger pump. The bubbles contained in the oil are subsequently separated by an oil filter or the like, but there is a risk of poor lubrication due to incomplete separation.

On the other hand, in the wet sump system only a relatively small amount of air bubbles are mixed into the oil, and some bubbles are further eliminated by the pressure of the pump. As a consequence, there is little risk of poor lubrication. However, there have been calls to reduce the size of the pump in order to improve fuel consumption performance. In such case, there is a risk that poor lubrication may occur because air bubbles have not been sufficiently eliminated.

Thus, the bubble fraction of oil must be decreased regardless of whether the lubrication system of the internal combustion engine is a dry sump system or wet sump system.

Hence, in order to solve the above problem, the use of a gas-liquid separator is proposed for the lubrication system of the internal combustion engine.

Currently known gas-liquid separators include one in which a fluid mixture made of gas and liquid is introduced into a cylindrical body thereof. The fluid mixture is then separated by centrifugation into the liquid and the gas (see Patent Document 1 for an example). According to Patent Document 1, a ceiling portion is provided with a gas discharge port, and a projecting portion is also provided to prevent fluid from penetrating the vicinity thereof And because the inflow of the gas-liquid fluid mixture is delayed, separated gas gathers at the ceiling portion of the gas-liquid separator body and there is no risk of the gas remixing with the inflow of gas-liquid fluid mixture anew.

[Patent Document 1] Japanese Patent Application Publication No. JP-A-2003-265984

According to Patent Document 1, however, if the inflow amount of oil is fast, then the gas is remixed by the oil flowing in from the oil induction port and the remixed fluid is discharged from the gas discharge port. Thus, the efficiency of gas-liquid separation may be lowered. Furthermore, the gas discharge port is positioned higher than the induction port, and there is no consideration given to a case where the gas discharge port is positioned lower than the induction port.

SUMMARY OF THE INVENTION

In view of the foregoing circumstances, it is an object of the present invention to provide a bubble separator that is capable of suppressing remixing after bubble separation, and is particularly capable of performing bubble separation with a high bubble separation efficiency for oil used in a lubrication system for an internal combustion engine.

The present invention is as follows.

1. A bubble separator that is a centrifugal separation type for eliminating bubbles included in oil used by a lubrication system for an internal combustion engine, the bubble separator comprising:
    a body with a generally cylindrical shape;
    an oil induction portion that is provided on said body, and introduces bubble-containing oil to inside said body;
    a gas discharge portion with a generally cylindrical shape that is provided extending from a ceiling portion of said body, and discharges separated bubbles to outside said body;
    an oil discharge portion that is provided on said body, and discharges separated oil to outside said body; and
    an upper partition that is provided extending from said ceiling portion, and is formed on a periphery of said gas discharge portion.
2. The bubble separator according to 1 above, wherein said gas discharge portion has a plurality of discharge holes on a front surface thereof, and a total opening area of said discharge holes positioned above a lower end of said upper partition is greater than a total opening area of said discharge holes positioned below said lower end of said upper partition.
3. The bubble separator according to 1 above, wherein said gas discharge portion has a plurality of discharge holes on a front surface thereof, and an opening area of said discharge holes progressively decreases toward a downward direction from said ceiling portion.
4. The bubble separator according to 1 above, wherein said gas discharge portion has a plurality of discharge holes on a front surface thereof, and an opening interval of said discharge holes progressively widens toward a downward direction from said ceiling portion.
5. The bubble separator according to 1 above, wherein said lower end of said upper partition is positioned below a lower end of said oil induction portion.
6. The bubble separator according to 1 above, further comprising:
    a lower partition that is positioned on a lower side of said gas discharge portion, and isolates said separated bubbles and said separated oil.

According to a bubble separator of the present invention, when bubble-containing oil, i.e., oil that contains air bubbles, is introduced to inside a body by an oil induction portion, an upper partition can prevent the bubble-containing oil from directly blowing into a discharge hole of a gas discharge portion and discharging to outside the body together with separated gas. Therefore, a bubble separation efficiency of the oil can be increased.

In cases where a total opening area of the discharge holes above a lower end of the upper partition is greater than a total opening area of the discharge holes below the lower end of the upper partition, more gas separated from oil toward an upper side of the body and protected by the upper partition can be removed. Therefore, the bubble separation efficiency can be increased.

In cases where the opening area of the discharge holes progressively decreases from a ceiling portion of the body to a bottom portion of the body, more separated gas that is present in a greater amount toward the upper side of the body can be removed. Therefore, the bubble separation efficiency can be increased.

In cases where an opening interval of the discharge holes progressively widens from a ceiling portion of the body to a bottom portion of the body, more separated gas that is present in a greater amount toward the upper side of the body can be removed. Therefore, the bubble separation efficiency can be increased.

In cases where the lower end of the upper partition is positioned below a lower end of the oil induction portion, bubble-containing oil introduced from the oil induction portion is blocked from reaching the gas discharge portion by the upper partition. Therefore, the bubble separation efficiency can be increased.

In cases where a lower partition is further provided, gas toward the lower side of the body that is separated from oil can thus be isolated so as to avoid remixing with oil toward the bottom portion side of the body. Therefore, the bubble separation efficiency can be increased.

DETAILED DESCRIPTION OF THE PREFERRED EMBODIMENTS

Hereinafter, a bubble separator of the present invention will be described in detail using FIGS. 1 to 9 as examples.

The bubble separator according to the present invention is a centrifugal separation type for eliminating bubbles that are included in oil used by a lubrication system such as that for an internal combustion engine.

Figure 1:
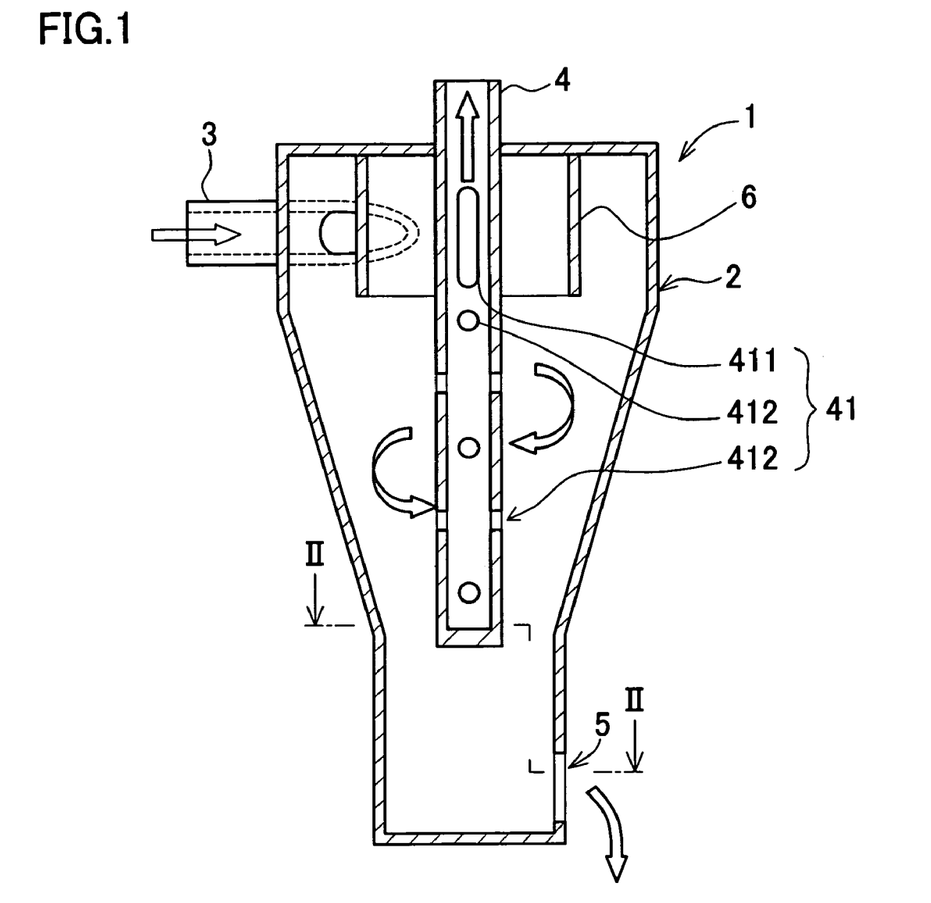
FIG. 1 is a vertical cross-sectional view of a bubble separator 1 according to an embodiment.
Figure 2:
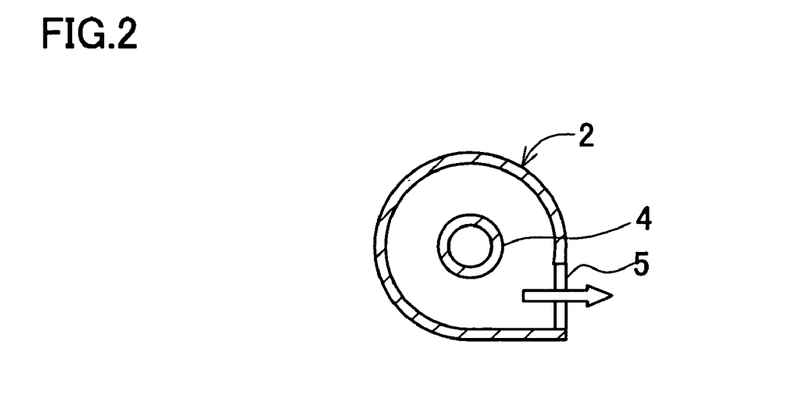
FIG. 2 is a cross-sectional view taken along a line II-II in FIG. 1.
Figure 5:
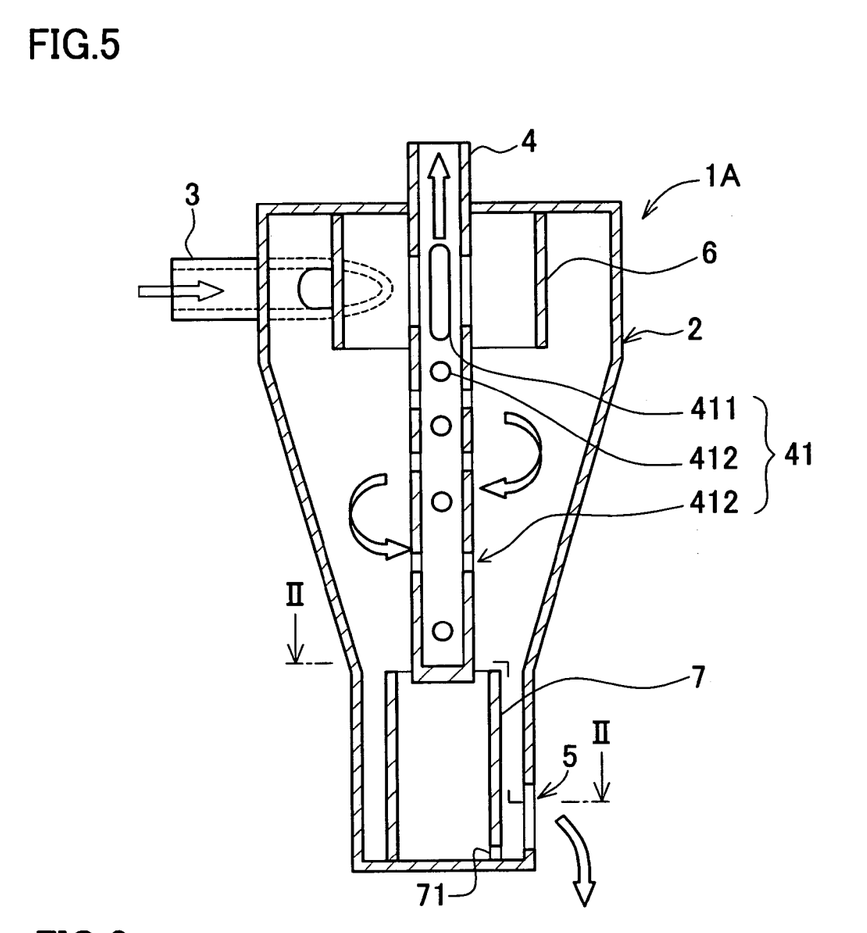
FIG. 5 is a vertical cross-sectional view of a bubble separator 1A according to another embodiment.

As FIGS. 1 and 2 shows, for example, a bubble separator 1 is equipped with a body 2, an oil induction portion 3, a gas discharge portion 4, an oil discharge portion 5, and an upper partition 6. In addition, a lower partition 7 may be further provided as illustrated in FIG. 5.

The above-mentioned "body" is normally equipped with a tapered portion and has a generally cylindrical shape; however, its size and material are not particularly limited.

The above-mentioned "oil induction portion" is an induction portion that introduces bubble-containing oil, i.e., oil that contains air bubbles, to inside the body. The configuration, shape and the like of the oil induction portion are not particularly limited. For example, as illustrated in FIG. 1, the oil induction portion can be formed from an oil induction pipe 3 that is provided extending in a tangential direction from an upper portion of a peripheral wall of the body.

It should be noted that an inflow speed of oil introduced from the oil induction portion is arbitrarily selected based on oil viscosity and the like. However, the inflow speed may be set, for example, to a speed of 2 to 15 m/s, and more preferably to a speed of 5 to 12 m/s.

The above-mentioned "gas discharge portion" is not particularly limited in terms of its layout position, configuration and the like, provided that the gas discharge portion is a generally cylindrical pipe capable of discharging gas separated from the bubble-containing oil to outside the body. For example, as illustrated in FIG. 1, the gas discharge portion can be formed from a gas discharge pipe 4 that is provided extending in an up-down direction and runs through a central portion of a ceiling portion of the body. In addition, the gas discharge pipe may be provided with a discharge hole on a peripheral surface thereof, whereby separated gas passes to inside the pipe.

The shape, size, and quantity of the above-mentioned "discharge hole" may be arbitrarily selected. For example, conceivable shapes of the discharge hole include a round shape (see a discharge hole 412 illustrated in FIG. 1 for an example), an oval shape (see a discharge hole 411 illustrated in FIG. 1 for an example), and an elliptical shape. Also, the discharge holes may have respectively different shapes and sizes.

Upper discharge holes are discharge ports positioned above a lower end of an upper partition. Similarly, lower discharge holes are discharge ports positioned below a lower end of the upper partition. A first total opening area, i.e., a total sum of the opening areas of the upper discharge holes, can be larger than a second total opening area, i.e., a total sum of the opening areas of the lower discharge holes. The upper discharge holes are blocked by the upper partition so that bubble-containing oil does not penetrate. For this reason, there is no risk of decreased efficiency resulting from the penetration of bubble-containing oil, regardless of a larger first total opening area.

Furthermore, the opening areas of the discharge holes may become progressively smaller in a downward direction from the ceiling portion.

"The opening areas become progressively smaller" regards the size of the respective discharge holes that are vertically adjacent in the gas discharge portion, and refers to decreasing the size of the discharge holes provided on the lower side so as to facilitate the discharge of more gas on the upper side. The swirl of separated gas 8 assumes a generally tapered shape at a lower side thereof. For this reason, increasing the opening areas of the discharge holes on the upper side where more gas is present makes it possible to discharge gas without oil being mixed therewith.

Note that the opening area of the discharge hole may be changed by arbitrary methods. For example, as illustrated in FIG. 5, the size of the discharge hole 411 on the upper side can be made larger than the discharge hole 412 on the lower side. Also, provided that the opening areas of the discharge holes become progressively smaller in the downward direction as a whole in the gas discharge portion, there may be discharge holes with the same opening area provided partway.

Furthermore, the opening interval between the discharge holes may become progressively wider in the downward direction from the ceiling portion.

"The opening interval becomes progressively wider" refers to increasing the practical opening area on the upper side by widening the interval between lower aligned discharge holes with respect to the interval between upper aligned discharge holes in the gas discharge portion. This in turn facilitates the discharge of more gas. By providing the discharge holes in such a manner, the same effect as in the case of the progressively smaller opening areas in the downward direction from the ceiling portion can be obtained. Also note, provided that the opening interval between the discharge holes becomes progressively wider in the downward direction as a whole in the gas discharge portion, there may be discharge holes with the same opening interval provided partway. In addition, the opening interval may become progressively wider in the downward direction and the opening areas may become progressively smaller in the downward direction.

The above-mentioned "oil discharge portion" is not particularly limited in terms of its layout position, configuration, shape and the like, provided that the oil discharge portion is capable of discharging separated oil to outside the body. Conceivable specific forms of the oil discharge portion include, for example: (1) a form configured such that separated oil is discharged toward one direction (such as an axial direction, radial direction or tangential direction of the body), and (2) a form configured such that separated oil is discharged along a surface in a circumferential direction of the body.

In form (1) above, the oil discharge portion may be formed from an oil discharge hole 5 that extends in one direction from either a lower portion of the peripheral wall of the body or a lower end wall of the body, such as illustrated in FIGS. 1 and 2. In form (2) above, the oil discharge portion may be formed having one or more oil discharge ports extending along the circumferential direction on the peripheral wall of the body.

The above-mentioned "upper partition" extends from the ceiling portion of the body and is provided so as to surround the periphery of the gas discharge portion. The upper partition is a partition in which bubble-containing oil is isolated on an outer side thereof and separated bubbles are isolated on an inner side thereof. Through such separation, it is possible to prevent bubble-containing oil from being blow back into and remixing with separated bubbles.

Figure 3:
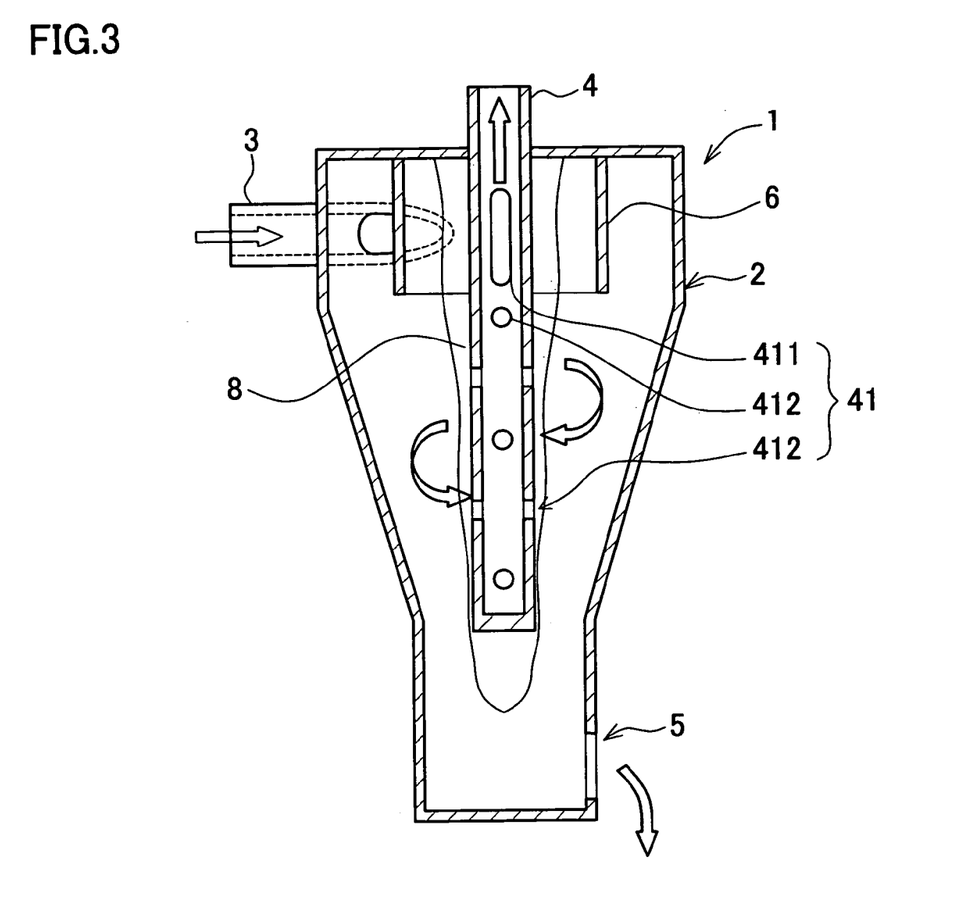
FIG. 3 is an enlarged schematic diagram for describing how gas-liquid separation is performed.

The shape of the upper partition is not particularly limited; however, a cylindrical shape is normally used such as shown by the upper partition 6 in FIGS. 1 and 3. Also, as illustrated by an upper partition 6A in FIG. 8, the upper partition may be tapered in an arbitrary direction, and may be provided with a through hole. Furthermore, a plurality of upper partitions may be disposed in a concentric circular configuration or the like.

The height of the upper partition may be arbitrarily selected; however, setting the lower end of the upper partition at least lower than a lower end of the oil induction portion is preferred. This is because the upper partition can prevent introduced bubble-containing oil from being directly blown into the gas discharge portion, and oil from being discharged from the gas discharge portion.

"So as to surround the periphery of the gas discharge portion" refers to positioning the gas discharge portion on the inner side of the cylindrical upper partition, and providing a clearance that enables gas separated from bubble-containing oil to pass between the upper partition and the gas discharge portion.

The above-mentioned "lower partition" is a partition provided on a lower side of the gas discharge portion. Also, the lower partition isolates bubble-containing oil on an outer side thereof, and isolates separated bubbles on an inner side thereof. When oil is discharged from the oil discharge portion, such a lower partition can prevent such oil from mixing with separated gas, resulting in the discharge of oil containing gas. In addition, the lower partition can prevent remixing caused by oil being blown into separated gas in the vicinity of the gas discharge portion.

The shape of the lower partition is not particularly limited, provided that it is capable of isolating bubble-containing oil and separated bubbles. Conceivable shapes include a cylindrical shape disposed so as to have the same center axis as the gas discharge portion 4, as illustrated by the lower partition 7 in FIG. 5. Tapering may also be provided as illustrated by a lower partition 7A in FIG. 8. Moreover, a plurality of lower partitions may be disposed in a concentric circular configuration or the like.

Figure 9:
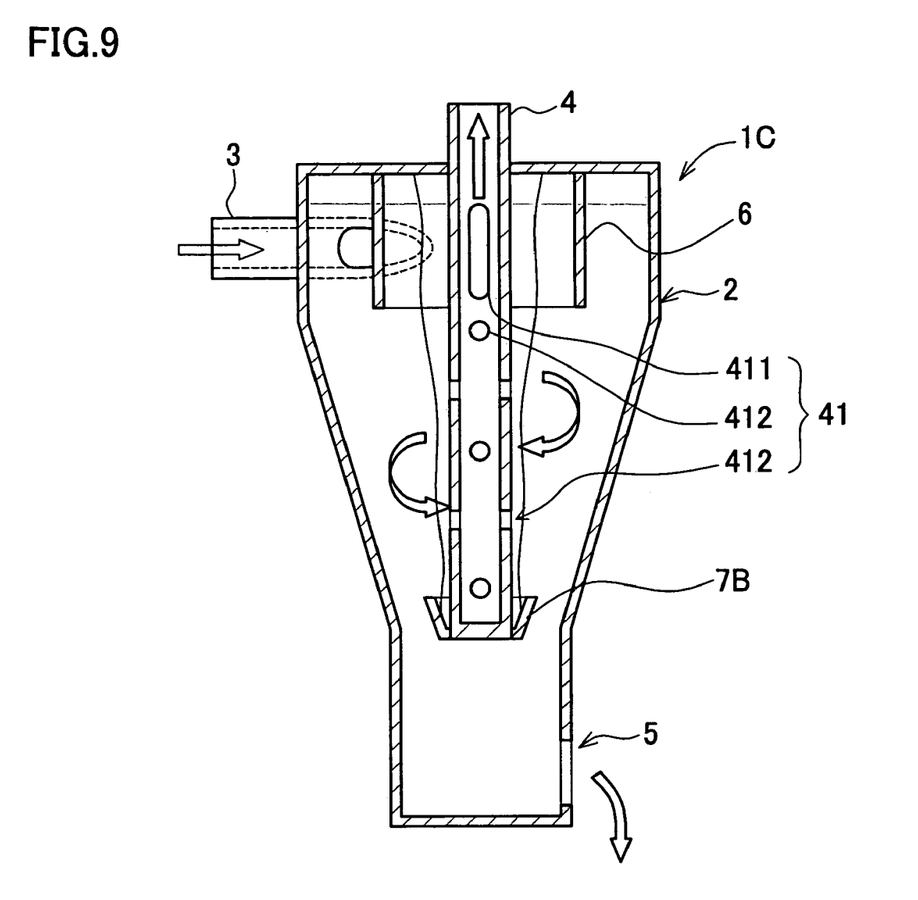
FIG. 9 is a vertical cross-sectional view of a bubble separator 1C according to still yet another embodiment.

As illustrated by a lower partition 7B in FIG. 9, the lower partition may also be a circular plate that defines the lower portion of the body 2 in the up-down direction, or a generally circular plate whose edge portion forms a wall surface.

"The lower side of the gas discharge portion" simply refers to the position at which the lower partition is disposed being lower than the lower end of the gas discharge portion. Conceivable positions include, for example, disposing the lower partition at a bottom portion of the body as illustrated by the lower partition 7 in FIG. 5, or disposing the lower partition at the lower end of the gas discharge portion 4 as illustrated by the lower partition 7B in FIG. 9.

"Providing centered around a center axis of the gas discharge portion" refers to disposing the lower partition such that a center of the lower partition is positioned over the center axis of the gas discharge portion. If the flow speed of introduced bubble-containing oil is fast, then a bottom of the swirl of separated gas approaches the bottom portion side of the body, which is positioned on the center axis of the gas discharge portion. Therefore, the swirl of gas is isolated from the oil by the lower partition, whereby it is possible to prevent bubble-containing oil from being blown into and remixing with separated gas.

The height of the lower partition, if the body 2 is provided with a non-tapered cylindrical portion below a tapered cylindrical portion, may be a height that does not exceed the height of the non-tapered cylindrical portion of the body 2, as illustrated in FIG. 5. In addition, the height of the lower partition may be a height that positions an upper end of the lower partition further upward than the lower end of the gas discharge portion.

As illustrated by the lower partition 7 in FIG. 5, a through hole 71 may also be provided on the lower end. Such a through hole can discharge accumulated oil in the lower partition. Therefore, it is possible to prevent the lower partition from filling up with oil and thus losing its effect as a partition.

Note that conceivable structures of an oil tank may include one characterized by having the bubble separator described using the above example disposed therein. The oil tank may be used for a dry sump, for example.

Hereinafter, specific embodiments will be used to describe the present invention with reference to the accompanying drawings.

1. Bubble Separator Configuration

A bubble separator according to a first embodiment, as shown in FIGS. 1 and 2, is used to eliminate bubbles, such as blow-by gas, that are included in bubble-containing oil, which is used by a lubrication system of an internal combustion engine for an automobile or the like. The bubble separator 1 has a body 2, an oil induction pipe 3 that acts as an oil induction portion, a gas discharge pipe 4 that acts as a gas discharge portion, and oil discharge hole 5 that acts as an oil discharge portion, and a upper partition 6.

The body 2 has a tapered cylindrical shape whose lower side becomes narrow.

The oil induction pipe 3 is provided on an upper portion of a peripheral wall of the body 2, and can introduce bubble-containing oil in a direction tangent to an inner periphery of the body 2.

The gas discharge pipe 4 is provided running through a general center of a ceiling portion of the body 2 and down to a lower side of the body 2. A discharge hole 41 is also provided for discharging separated bubbles to outside the body 2. The discharge hole 41 can be divided into an upper discharge hole 411 and a lower discharge hole 412. The upper discharge hole 411 is above a lower end of the upper partition 6 in a horizontal direction of the body 2, and has an oval shape into which no oil blows thanks to the upper partition 6. The lower discharge hole 412 has a circular shape and is below the lower end of the upper partition 6. A total opening area obtained by adding up the opening areas of all the upper discharge holes 411 is greater than a total opening area obtained by adding up the opening areas of all the lower discharge holes 412. Gas 8 separated from the bubble-containing oil is discharged to outside the body from the gas discharge pipe 4 by mainly the upper discharge hole 411.

The oil discharge hole 5 is provided so as to extend in a direction tangent to the lower portion of the peripheral wall of the body 2, as shown in FIG. 2. The oil discharge hole 5 can discharge separated oil to outside the body 2. The opening area of the oil discharge hole 5 is greater than the opening area of the oil induction pipe 3, and can efficiently discharge oil.

The upper partition 6 has a cylindrical shape, and is provided extending from the ceiling portion of the body 2 so as to surround an upper periphery of the gas discharge pipe 4. In addition, the lower end of the upper partition 6 is positioned lower than the lower end of the oil induction pipe 3.

2. Bubble Separator Usage

Next, a method for using the bubble separator with the above configuration will be described.

As FIG. 3 shows, bubble-containing oil is introduced to inside the body 2 from the oil induction pipe 3. Due to the centrifugal force of the introduced bubble-containing oil, oil with a large specific gravity collects toward an inner wall of the body 2, and bubbles with a small specific gravity collects toward the center of the body 2. As a consequence, the separated bubbles enter the gas discharge pipe 4 via the discharge hole 41, and are then discharged to outside the body 2. Meanwhile, the separated oil is discharged to outside the body 2 via the oil discharge hole 5.

Note that a flow speed of the bubble-containing oil in the bubble separator according to the present embodiment is 2 to 15 m/s.

Figure 4:
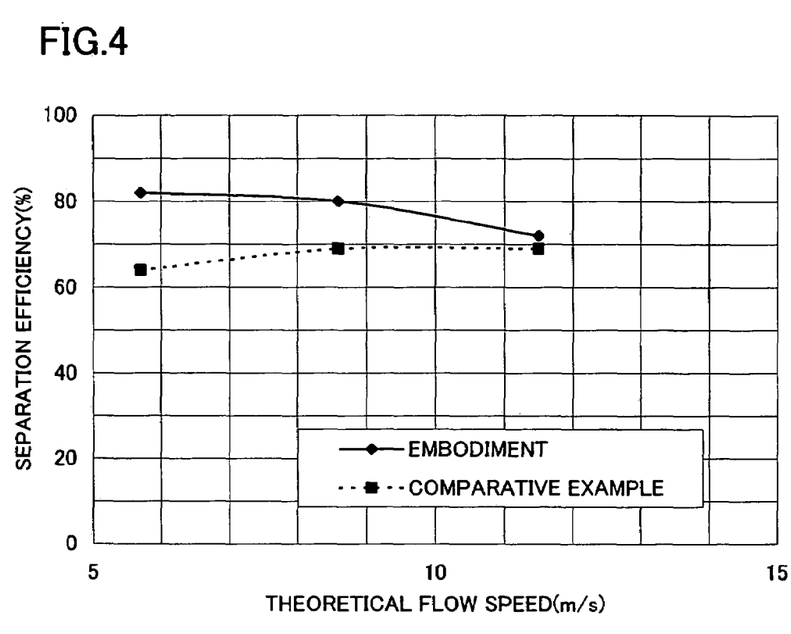
FIG. 4 is a graph showing a separation efficiency in accordance with an inflow speed.

To compare the present embodiment with the comparative example that is not equipped with the upper partition 6 but otherwise similar to the present embodiment in configuration, a comparison was made of respective separation efficiencies, as shown in FIG. 4. The type of bubble-containing oil used was 0 W-20 and included a bubble fraction of 20% at 80° C. The bubble fraction of oil discharged from the oil discharge hole 5 was also investigated, and a ratio of the pre-inflow bubble fraction and this bubble fraction was set as the separation efficiency.

The results showed that the separation efficiency of the present embodiment is higher than the comparative example for a flow speed within the range of approximately 5 to 15 m/s. Furthermore, after observation of a bubble separator according to the present embodiment made from transparent resin, it was confirmed-that separated gas is present in the upper partition 6, as illustrated in FIG. 3.

3. Other Embodiments of the Bubble Separator

Figure 6:
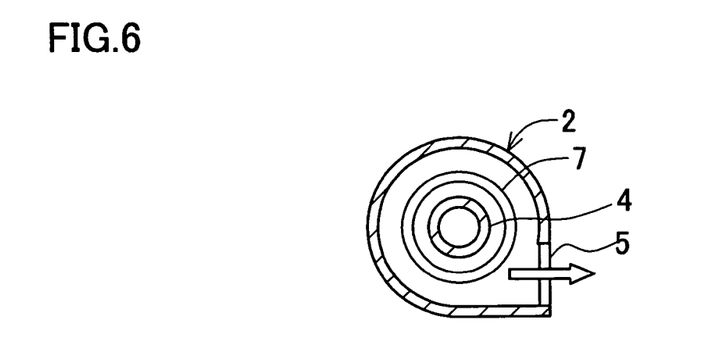
FIG. 6 is a vertical cross-sectional view taken along a line II-II in FIG. 5.
Figure 7:
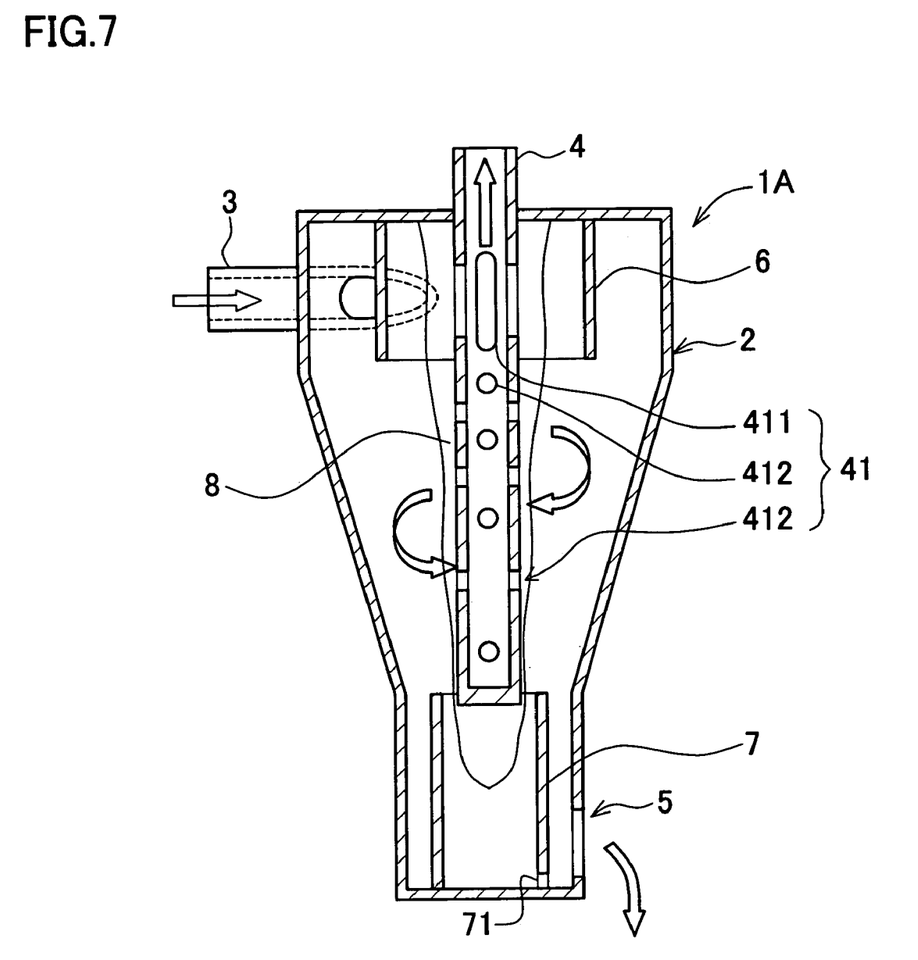
FIG. 7 is an enlarged schematic diagram for describing how gas-liquid separation is performed.
Figure 8:
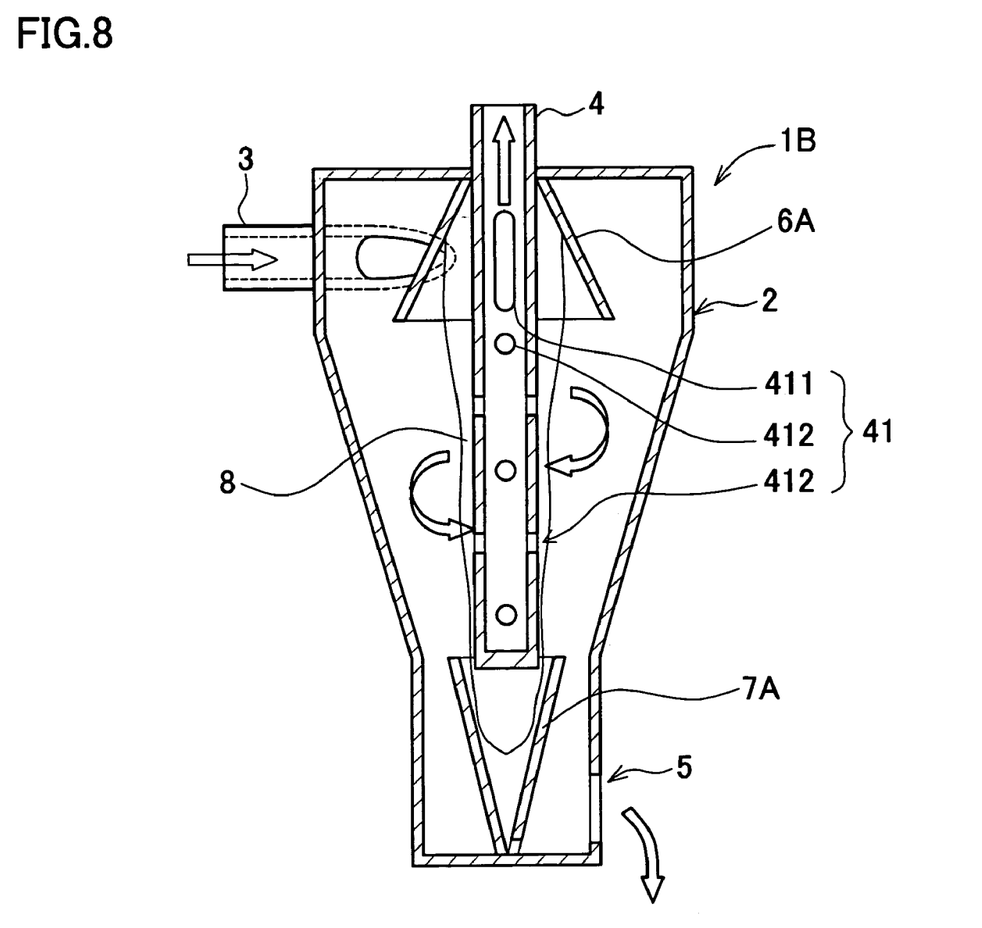
FIG. 8 is a vertical cross-sectional view of a bubble separator 1B according to yet another embodiment.

As shown in FIGS. 5 and 6, a bubble separator 1A according to a second embodiment further provides a lower partition 7 in the bubble separator 1 according to the first embodiment. The lower partition 7 is a cylindrical partition with the same center axis as the upper partition 6, and is provided extending from a bottom portion of the body 2, which is positioned downward of the gas discharge pipe 4. An upper end of the lower partition 7 has a height that enables slight overlap with a lower end of the gas discharge pipe 4. When oil is discharged from the oil discharge hole 5, such a bubble separator 1A according to the second embodiment can prevent such oil from mixing with separated gas 8, resulting in the discharge of oil containing bubbles. In addition, the bubble separator 1A can prevent remixing caused by oil being blown into separated gas in the vicinity of the gas discharge pipe 4.

In the bubble separator 1A according to the second embodiment, an interval at which a plurality of the lower discharge holes 412 is disposed progressively widens toward the lower side of the gas discharge pipe 4. Thus, the practical opening area progressively decreases toward the lower side of the gas discharge pipe 4. By disposing the lower discharge holes 412 in such a manner, more separated gas that is present in a greater amount toward the upper side can be removed. Therefore, the bubble separation efficiency can be increased.

It should be noted that the present invention is not limited to the above embodiments, and various modifications are possible within the scope of the present invention in accordance with the purpose and application. Namely, in the above embodiments, an "oil discharge portion" according to the present invention is configured from the oil discharge hole 5 that is provided extending from the peripheral surface of the body. However, the present invention is not limited by this, and oil may be discharged from a bottom surface of the body.

In addition, the bubble separator 1 and 1A according to the embodiment may be disposed within an oil tank for a dry sump lubrication system, or disposed in an oil passage (a pipe or the like) downstream of an oil pump for a wet sump lubrication system.

The bubble separator is widely used as art for eliminating bubbles that are included in oil used by a lubrication system of an internal combustion engine for an automobile or the like. In particular, the bubble separator is well suited as art for eliminating bubbles that are included in oil used by a dry sump lubrication system.

What is claimed is:

1. A bubble separator that is a centrifugal separation type for eliminating bubbles included in oil used by a lubrication system for an internal combustion engine, the bubble separator comprising:

a body with a generally cylindrical shape;

an oil induction portion that is provided on said body, and introduces bubble-containing oil to inside said body;

a gas discharge portion with a generally cylindrical shape that is provided extending from a ceiling portion of said body, and discharges separated bubbles to outside said body;

an oil discharge portion that is provided on said body, and discharges separated oil to outside said body; and an upper partition that is provided extending from said ceiling portion, and is formed on a periphery of said gas discharge portion, a lower end of said upper partition is positioned below a lower end of said oil induction portion and a lower end of said gas discharge portion is positioned below said lower end of said upper partition.

2. The bubble separator according to claim 1, further comprising:

a lower partition that is positioned on a lower side of said gas discharge portion, and isolates said separated bubbles and said separated oil.

3. The bubble separator according to claim 1, wherein said gas discharge portion has a plurality of discharge holes on a front surface thereof.

4. The bubble separator according to claim 3, wherein a total opening area of said discharge holes positioned above a lower end of said upper partition is greater than a total opening area of said discharge holes positioned below said lower end of said upper partition.

5. The bubble separator according to claim 3, wherein an opening area of said discharge holes progressively decreases toward a downward direction from said ceiling portion.

6. The bubble separator according to claim 3, wherein an opening interval of said discharge holes progressively widens toward a downward direction from said ceiling portion.

* * * * *